US012032461B2

(12) United States Patent
Tan et al.

(10) Patent No.: US 12,032,461 B2
(45) Date of Patent: Jul. 9, 2024

(54) SOFTWARE UPGRADE STABILITY RECOMMENDATIONS

(71) Applicant: INTERNATIONAL BUSINESS MACHINES CORPORATION, Armonk, NY (US)

(72) Inventors: Jefferson Tan, Melbourne (AU); Bruno de Assis Marques, Point Cook (AU); Lenin Mehedy, Doncaster East (AU); Sengor Kusturica, Melbourne (AU); Hidemasa Muta, Mordialloc (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 497 days.

(21) Appl. No.: 17/133,491

(22) Filed: Dec. 23, 2020

(65) Prior Publication Data

US 2022/0197770 A1  Jun. 23, 2022

(51) Int. Cl.
*G06F 11/30* (2006.01)
*G06F 8/61* (2018.01)
(Continued)

(52) U.S. Cl.
CPC ............ *G06F 11/3051* (2013.01); *G06F 8/61* (2013.01); *G06F 8/65* (2013.01); *G06F 11/302* (2013.01); *G06F 11/327* (2013.01)

(58) Field of Classification Search
CPC .......... G06F 8/61; G06F 8/65; G06F 11/3051; G06F 11/302; G06F 11/327
See application file for complete search history.

(56) References Cited

U.S. PATENT DOCUMENTS 7,191,435 B2  3/2007 Lau et al.
8,423,963 B2  4/2013 Garbers et al.
(Continued)

FOREIGN PATENT DOCUMENTS

CN   110764798 A   2/2020

OTHER PUBLICATIONS

Ye et al., Microcode upgrading method and device, computer equipment and storage medium (English translation of foreign patent document CN110764798), publication date Jul. 2, 2020, pp. 1-8 (Year: 2020).*

(Continued)

*Primary Examiner* — S. Sough
*Assistant Examiner* — Zheng Wei
(74) *Attorney, Agent, or Firm* — Intelletek Law Group, PLLC; Gabriel Daniel, Esq.

(57) ABSTRACT

A method and system determine a potential impact from software upgrades on a computing device. A device configuration is identified for a first computing device based on the software and hardware elements currently present. Other computing devices are identified in the network having installed the software application upgrade. A history of operating behavior associated with the software application upgrade is retrieved. The profile is analyzed for each of the other computing devices for conflicts with the software application. A determination is made as to whether the software application upgrade will potentially cause a failure in the first computing device based on the history of operating behavior associated with the software application upgrade and based on a state of similarity between the analyzed profile for each of the other computing devices and the profile of the first computing device. The end user is presented with a risk-based recommendation.

20 Claims, 7 Drawing Sheets

(51) Int. Cl.
  *G06F 8/65* (2018.01)
  *G06F 11/32* (2006.01)

(56) References Cited

U.S. PATENT DOCUMENTS

| | | |
|---|---|---|
| 8,949,814 B2 | 2/2015 | Green et al. |
| 9,063,823 B2 | 6/2015 | Imrey et al. |
| 9,558,464 B2 | 1/2017 | Bassin et al. |
| 9,921,948 B2 | 3/2018 | Zieder et al. |
| 10,579,371 B2 | 3/2020 | Agarwal et al. |
| 11,886,296 B2 * | 1/2024 | Chen .................. G06F 11/008 |
| 2003/0229890 A1 * | 12/2003 | Lau ..................... H04L 67/306 717/174 |
| 2004/0078686 A1 * | 4/2004 | Toyooka ............ G06F 11/3466 714/E11.2 |
| 2004/0199621 A1 | 10/2004 | Lau |
| 2006/0184927 A1 | 8/2006 | Deblaquiere et al. |
| 2016/0179498 A1 | 6/2016 | Das et al. |
| 2020/0019393 A1 * | 1/2020 | Vichare .................. G06N 20/00 |
| 2021/0157562 A1 * | 5/2021 | Sethi ..................... G06F 9/453 |
| 2021/0382759 A1 * | 12/2021 | Ji ........................... G06F 8/65 |
| 2022/0276931 A1 * | 9/2022 | Chen ..................... G06F 9/4411 |
| 2023/0018199 A1 * | 1/2023 | Mahamuni .......... G06F 11/3051 |

OTHER PUBLICATIONS

Mockus et al., "Predicting Risk of Software Changes", published by Bell Labs Technical Journal, April-Jun. 2000, pp. 169-180 (Year: 2000).*

Search and Examination Report issued Sep. 7, 2022 in related GB Application No. GB2117487.5, 7 pgs.

Mell, P. et al., "Recommendations of the National Institute of Standards and Technology"; NIST Special Publication 800-145 (2011); 7 pgs.

* cited by examiner

SOFTWARE UPGRADE STABILITY RECOMMENDATIONS

BACKGROUND

Technical Field

The present disclosure generally relates to networking systems, and more particularly, to system and method for software upgrade stability recommendations.

Description of the Related Art

Software upgrades, although necessary for keeping a system secure and stable, are hardly immune to failure, which is one of the main causes of users avoiding proceeding with upgrading software as it becomes available. The upgrades may behave unexpectedly and cause unplanned delays, thereby causing instability and loss of productivity of the main user of the affected device.

Users have a reasonable expectation that device software upgrades proceed smoothly, but developers, who do understand compatibilities, dependencies, and flaws in their own products, have less knowledge about mismatched libraries, drivers, operating systems, and hardware components that they did not develop. Incompatibilities may not be known until upgrades have been attempted. Upgrade checks will mostly consider only packages managed by the same package management system or source company. Upgrade checks may not account for the uniqueness in custom packages or environment components that are configured peculiarly or built from source code, or by external package management systems. Sometimes, a completely out of band solution could be the missing element that brings systems into stability (for example, a system reboot), but is not captured in developer documentation. It may be the case that only trial and error, will reveal incompatibilities. For this reason, reading through forum discussions can be valuable, but involves a bit of luck and a lot of trawling through related but not directly relevant information.

Inside an enterprise, it is already possible to harvest insight from the experience of others through automation and software monitoring agents. The agents collect data for audit purposes, verifying secure configurations or versions, or to generate statistical reports. However, monitoring agents do not reconcile or understand software upgrade issues between similar systems that affect stability.

Some approaches that generate an upgrade risk map to assess the likelihood of success of an upgrade of a specific software package may exist. However, these approaches may not take into consideration the stability of other software packages in the same system not necessarily related to the software upgrade.

SUMMARY

According to an embodiment of the present disclosure, a method for determining a potential impact from software upgrades on a computing device is provided. The method includes recording a profile of software and hardware elements currently present in each computing device in a network including a plurality of computing devices. A query for a software application upgrade for a software application resident in a first computing device is received. A device configuration is identified for the first computing device based on the software and hardware elements currently present in the first computing device. Other computing devices are identified in the network having installed the software application upgrade. A history of operating behavior associated with the software application upgrade in the identified other computing devices is retrieved. The profile is retrieved for each of the other computing devices. The profile is analyzed for each of the other computing devices for hardware or software conflicts with the software application. A determination is made as to whether the software application upgrade will potentially cause a failure in the software or hardware elements currently present in the first computing device based on the history of operating behavior associated with the software application upgrade in the identified other computing devices and based on a state of similarity between the analyzed profile for each of the other computing devices and the profile of the first computing device. In addition, an end user of the first computing device is presented with a risk-based recommendation of whether to install the software upgrade into the first computing device based on the determination.

In one embodiment, the method includes identifying a second computing device, wherein the second computing device exhibits a stable operating configuration. Attributes are identified related to failure events associated with the software upgrade in the respective other computing devices. Differences are analyzed between the configuration of the second computing device and each of the respective other computing devices with failure events associated with the software upgrade. Additionally, the differences in configuration of the second computing device and of the respective other computing devices are determined, wherein the risk-based recommendation is based on the determined differences in configuration.

According to an embodiment of the present disclosure, a computer program product for determining a potential impact from software upgrades on a computing device is provided. The computer program product includes one or more computer readable storage media, and program instructions collectively stored on the one or more computer readable storage media. The program instructions include recording a profile of software and hardware elements currently present in each computing device in a network including a plurality of computing devices. A query for a software application upgrade for a software application resident in a first computing device is received. A device configuration is identified for the first computing device based on the software and hardware elements currently present in the first computing device. Other computing devices are identified in the network having installed the software application upgrade. A history of operating behavior associated with the software application upgrade in the identified other computing devices is retrieved. The profile is retrieved for each of the other computing devices. The profile is analyzed for each of the other computing devices for hardware or software conflicts with the software application. A determination is made as to whether the software application upgrade will potentially cause a failure in the software or hardware elements currently present in the first computing device based on the history of operating behavior associated with the software application upgrade in the identified other computing devices and based on a state of similarity between the analyzed profile for each of the other computing devices and the profile of the first computing device. In addition, an end user of the first computing device is presented with a risk-based recommendation of whether to install the software upgrade into the first computing device based on the determination.

According to one embodiment, the program instructions further include recording the profile in the first computing device immediately before or after an installation of the software application upgrade in the first computing device.

According to an embodiment of the present disclosure, a computer server is disclosed. The computer server includes: a network connection; one or more computer readable storage media; a processor coupled to the network connection and coupled to the one or more computer readable storage media; and a computer program product including program instructions collectively stored on the one or more computer readable storage media. The program instructions include recording a profile of software and hardware elements currently present in each computing device in a network including a plurality of computing devices. A query for a software application upgrade for a software application resident in a first computing device is received. A device configuration is identified for the first computing device based on the software and hardware elements currently present in the first computing device. Other computing devices are identified in the network having installed the software application upgrade. A history of operating behavior associated with the software application upgrade in the identified other computing devices is retrieved. The profile is retrieved for each of the other computing devices. The profile is analyzed for each of the other computing devices for hardware or software conflicts with the software application. A determination is made as to whether the software application upgrade will potentially cause a failure in the software or hardware elements currently present in the first computing device based on the history of operating behavior associated with the software application upgrade in the identified other computing devices and based on a state of similarity between the analyzed profile for each of the other computing devices and the profile of the first computing device. In addition, an end user of the first computing device is presented with a risk-based recommendation of whether to install the software upgrade into the first computing device based on the determination.

According to one embodiment, the program instructions for the computer server further comprise receiving a weighting value and associating the weighting value with the software application, wherein the recommendation of whether to install the software upgrade into the first computing device is based further on the weighting value of the software application.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods for assessing the risk of success of a system software upgrade and its effect on system stability using insights collected from the observed state and experiences from a collection of similar devices. Generally, the embodiments may be practiced in the fields of computers and computer networks.

In the subject disclosure that follows, embodiments propose a software upgrade assistant system and process that exploits insights generated by analytics over the current environment of an end user system (for example, an employee of the company) with its mix of hardware components and software with varying versions. Embodiments may include a knowledge base about other systems with varying mixes of hardware components and software with varying versions. The subject technology may analyze the history of successful and failed software upgrades and stability of other systems that implemented same software upgrades, to advise against problematic upgrades in terms of target versions or prospective mismatch of packages. Embodiments may analyze the history for stable upgrades determined from harvested data which may be used to provide a confidence score recommendation when a user is notified of a potential upgrade. Aspects of the subject disclosure improve the functioning of computing devices by learning which hardware/software factors may conflict with some software upgrades and by forecasting the potential for failures in a computing device should the device install one or more software upgrades.

Example Architecture

Figure 1:
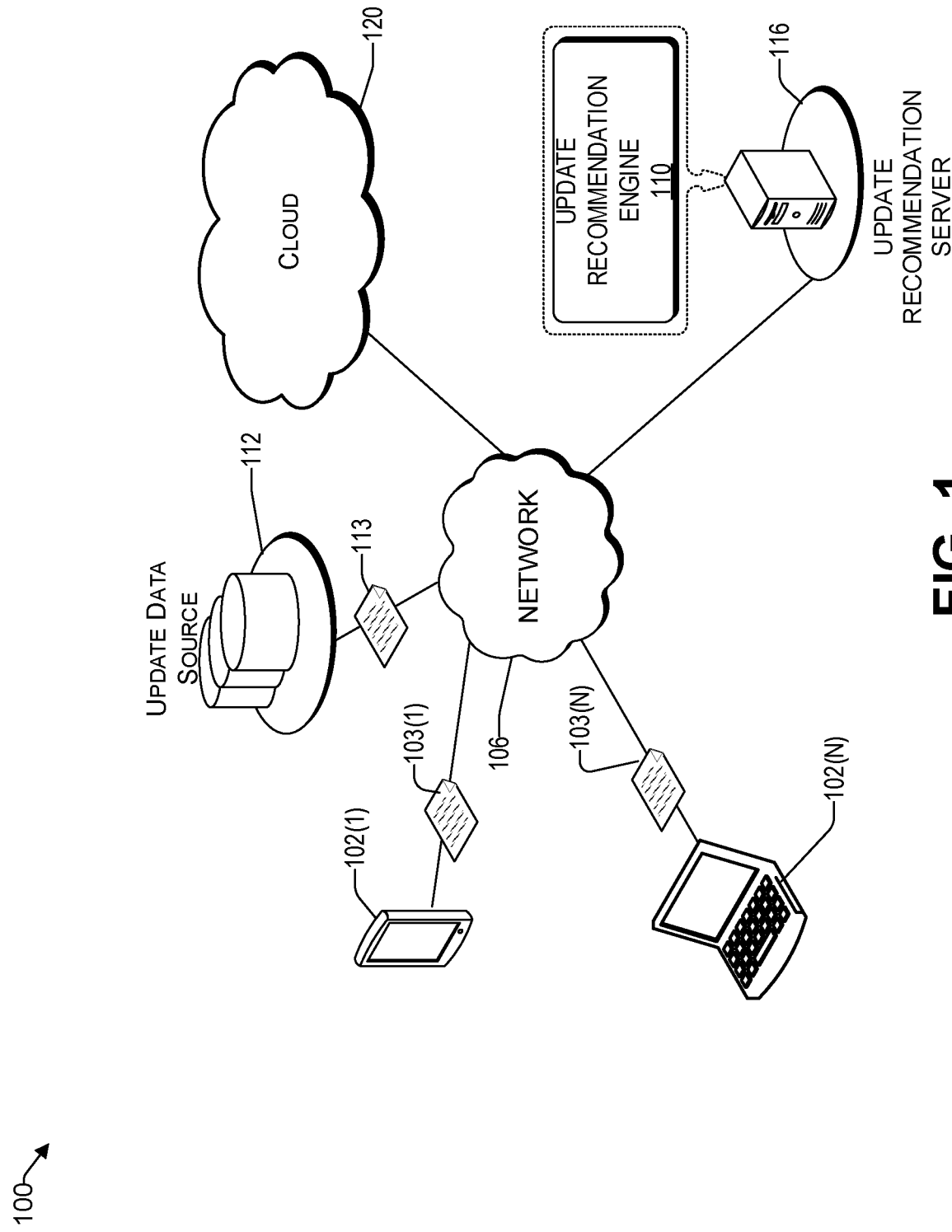
FIG. 1 is a block diagram of an architecture for software upgrade stability recommendations and scheduling according to an embodiment.

FIG. 1 illustrates an example architecture 100 for software upgrade stability recommendations and scheduling. Architecture 100 includes a network 106 that allows various computing devices 102(1) to 102(N) to communicate with each other, as well as other elements that are connected to the network 106, such as update data source 112, an update recommendation server 116, and the cloud 120.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. The network 106 allows an update recommendation engine 110, which is a software program running on the update recommendation server 116, to communicate with the update data source 112, computing devices 102(1) to 102(N), and the cloud 120, to provide data processing. The update data source 112 may provide software update data that will be processed under one or more techniques described here. The software update data may include new or upgrade versions of software applications resident in the memory/data storage elements of a computing device or in firmware within hardware components. In one embodiment, the data processing is performed at least in part on the cloud 120.

For purposes of later discussion, several user devices appear in the drawing, to represent some examples of the computing devices that may be the source of data being analyzed depending on the task chosen. Aspects of the symbolic sequence data (e.g., 103(1) and 103(N)) may be communicated over the network 106 with the update recommendation engine 110 of the update recommendation server 116. Today, user devices typically take the form of portable handsets, smart-phones, tablet computers, personal digital assistants (PDAs), and smart watches, although they may be implemented in other form factors, including consumer, and business electronic devices.

For example, a computing device (e.g., 102(N)) may send a request 103(N) to the update recommendation engine 110 to identify software versions stored in the computing device 102(N).

While the update data source 112 and the update recommendation engine 110 are illustrated by way of example to be on different platforms, it will be understood that in various embodiments, the update data source 112 and the update recommendation server 116 may be combined. In other embodiments, these computing platforms may be implemented by virtual computing devices in the form of virtual machines or software containers that are hosted in a cloud 120, thereby providing an elastic architecture for processing and storage.

Figure 2:
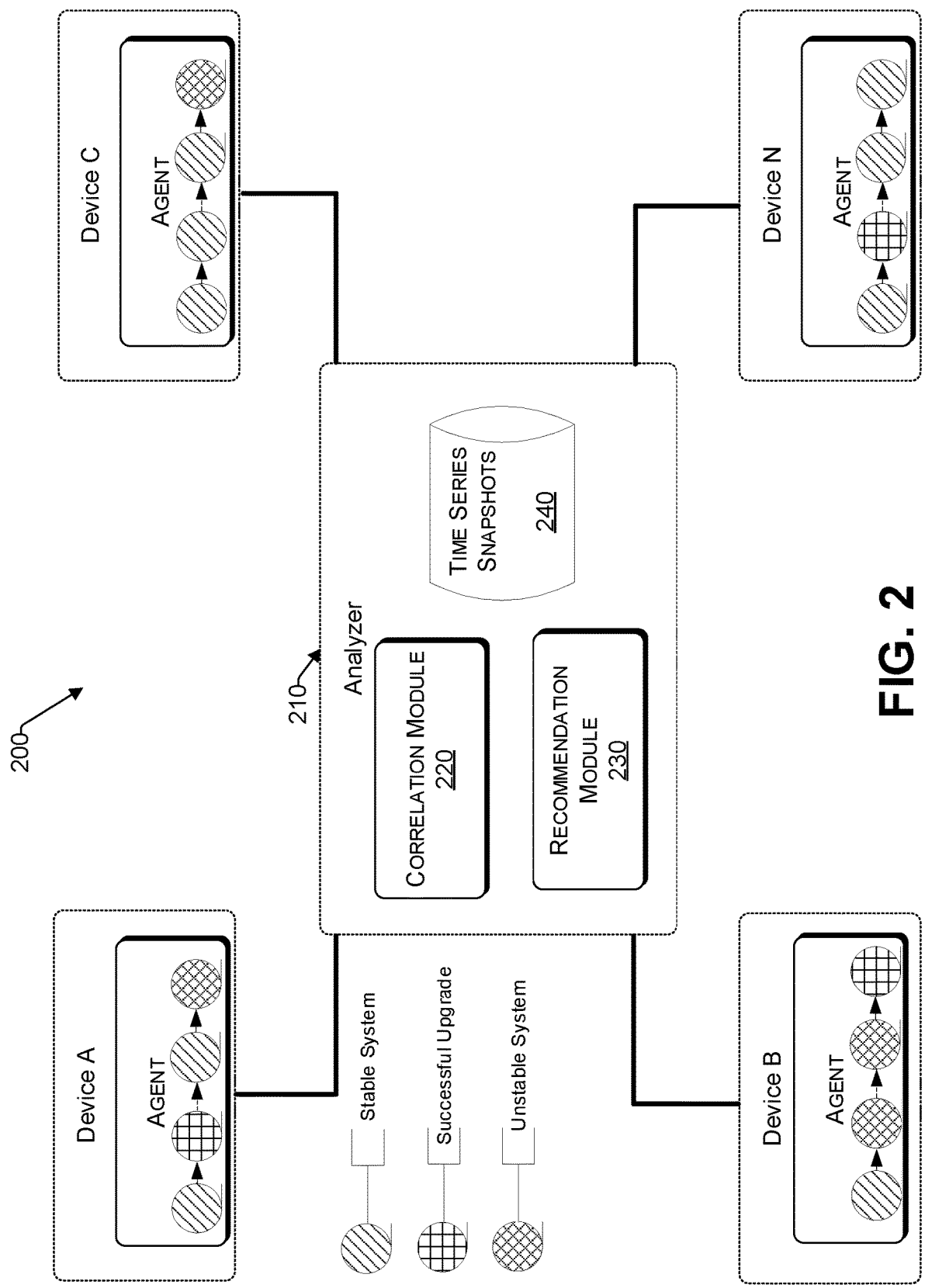
FIG. 2 is a block diagram of a system for determining software upgrade stability recommendations according to some embodiments.

Reference now is made to FIG. 2, which is an architecture 200 for determining software upgrade stability recommendations and scheduling according to an embodiment. The architecture 200 may generally include an analyzer module 210 in communication with one or more computing devices (represented symbolically by Devices A, B, C, . . . N). In some embodiments, the software implemented by the underlying methods may include a scheduling module (labeled as "agent" in the drawing) that is resident on the computing devices. The scheduling module may be a software module that monitors the current operating state of hardware and software on a computing device and schedules logging of current operating states. The scheduling module may communicate with the analyzer module 210 providing information related to the current hardware characteristics of a computing device and versions of software applications currently active. In some embodiments, the scheduling module may generate a system profile for the computing device. The profile may include, for example: the current software packages installed, the hardware components installed or connected to the device, certificates installed, power events (for example, logs of sleep, hibernation, shutdown, and reboots), update attempts, success or failure logs, behavior markers of stability/instability, security compliance, running processes and services, and resource utilization (for example, memory use, CPU usage, diskspace, inodes, and sockets).

The scheduling module may periodically take a snapshot of the computing device profile. The snapshots may include the current state of libraries, packages, and logged events. The scheduling module may send reports of the snapshots to the analyzer module 210. Snapshots are represented symbolically by the circles housed within each scheduling module box. In some embodiments, scheduling modules may record a snapshot in response to the occurrence of a software upgrade or some other change in the computing device which triggers a call to the analyzer module 210 to evaluate the current state of the device. For example, snapshots may be captured by the scheduling module immediately before and after an upgrade. After the upgrade, the scheduling module may launch a success benchmark test which may include verifying the following:

anti-virus is running;
Wi-fi is working;
VPN is working;
Crashplan is functional;
Docker engine is running;
Mini-kube is running, etc.

The benchmark success criteria may be set by an administrator. For example, success may be based on comparing the pre- and post-upgrade snapshot and checking for the occurrences of failures to one or more other software applications or hardware operations. The stability of the upgrade may be based on a subsequent period of time post-upgrade without the device software or hardware experiencing failures. In some embodiments, a user may also specify additional customized success criteria (which may be on top of what an administrator has defined for the enterprise network systems). For example, a developer in the company may add additional commands to check certain programs running (for example, ssh) that are required for her daily work. The additional commands may be shell scripts, python® scripts or an executable program that checks stability of certain programs and injects the status in the stability benchmark report.

As an illustrative example, snapshots may be determined to exhibit one of three states: a stable system; a successful upgrade event; or an unstable system. A time series of the snapshots recorded may be stored in database 240. The history of snapshots and their content may be analyzed by a correlation module 220 to determine the underlying factors that exhibited stability or instability in a computing device. The underlying factors may include a history of behavior by the software application and/or the attributes associated with hardware and software elements present in devices. In operation, the analyzer module 210 ingests the reports from the scheduling modules. A system state time series is generated for each device. This captures the state of a computing device system across time, focusing on maintaining the continuous state of stability or functionality. The time series may be represented and processed as a graph. The snapshots may be represented and processed as a dictionary, for example, key-value pairs. Based on a device's configuration, the analyzer module 210 may correlate and identify devices with similar states of configuration, considering factors that are significant to the outcomes of an upgrade. A similarity between devices may be based on hardware devices present, firmware versions used for hardware, software applications enabled, software versions in use, and operating systems in use. The analyzer module 210 may provide the following exemplary statistics based on data captured from samples:
- the likelihood of a successful upgrades;
- the likelihood of the system remaining stable;
- factors that relate to the unsuccessful upgrades; and
- factors that relate to successful upgrades.

The analyzer module 210 statistics may be used to convey recommendations through the recommendation module 230 to the user via the scheduling module.

Upon an unsuccessful upgrade, the analyzer module 210 may perform subsequent analysis to determine factors that likely relate to a failure and for potential courses of remediation.

In the block diagram 200, each device illustrates a different scenario which may occur under embodiments of the subject disclosure. While four scenarios are shown, it will be understood that other scenarios are contemplated. Device A for example, shows a time series of snapshots that exhibit a stable system, then a successful upgrade implementation, a stable system, and then an unstable system. The scenario may represent a user having upgraded their software when there is no known experience about the upgrade. If the upgrade succeeds, the scheduling module will be reporting on the pre-upgrade and post-upgrade state. It will also monitor the continuous functionality of the system based on acceptance criteria that will be stored in the knowledge base as an indicator for stability.

Device B exhibited a snapshot of a stable system, then successive snapshots of an unstable system profile, and then a successful upgrade. A user may have upgraded their software when there is no known experience about the upgrade. The software upgrade results in a failure that further causes instability in the system, (for example, Wi-fi stops working, applications crash). The scheduling module may report pre- and post-upgrade states, and such metadata may be processed in the remote stability analyzer module 210 to determine correlations that may point to causes.

Device C showed three successive snapshots of a stable system, and then a snapshot of an unstable system. A user may have attempted to upgrade their software when there is known experience about the upgrade. The scheduling module may report probabilities of success or failure based on the known experience, possibly cautioning against the upgrade in the first place.

Device N exhibited a stable system, a successful upgrade profile, and continued stability in the next two snapshots. A user may have attempted to upgrade their software when the scheduling module has reported on unlikely success due to negative previous experiences. The attempt succeeds! The scheduling module reports the outcomes to the analyzer module 210 and experiential data changes so that a possible false positive is identified. It is also possible that the user may have attempted precautionary steps, (for example, installation or removal of packages, reconfigurations). The precautionary actions may also be recorded by the scheduling module as it captures pre- and post-upgrade states. The precautionary steps may be integrated into experiential data records.

Example Methodology

Figure 3:
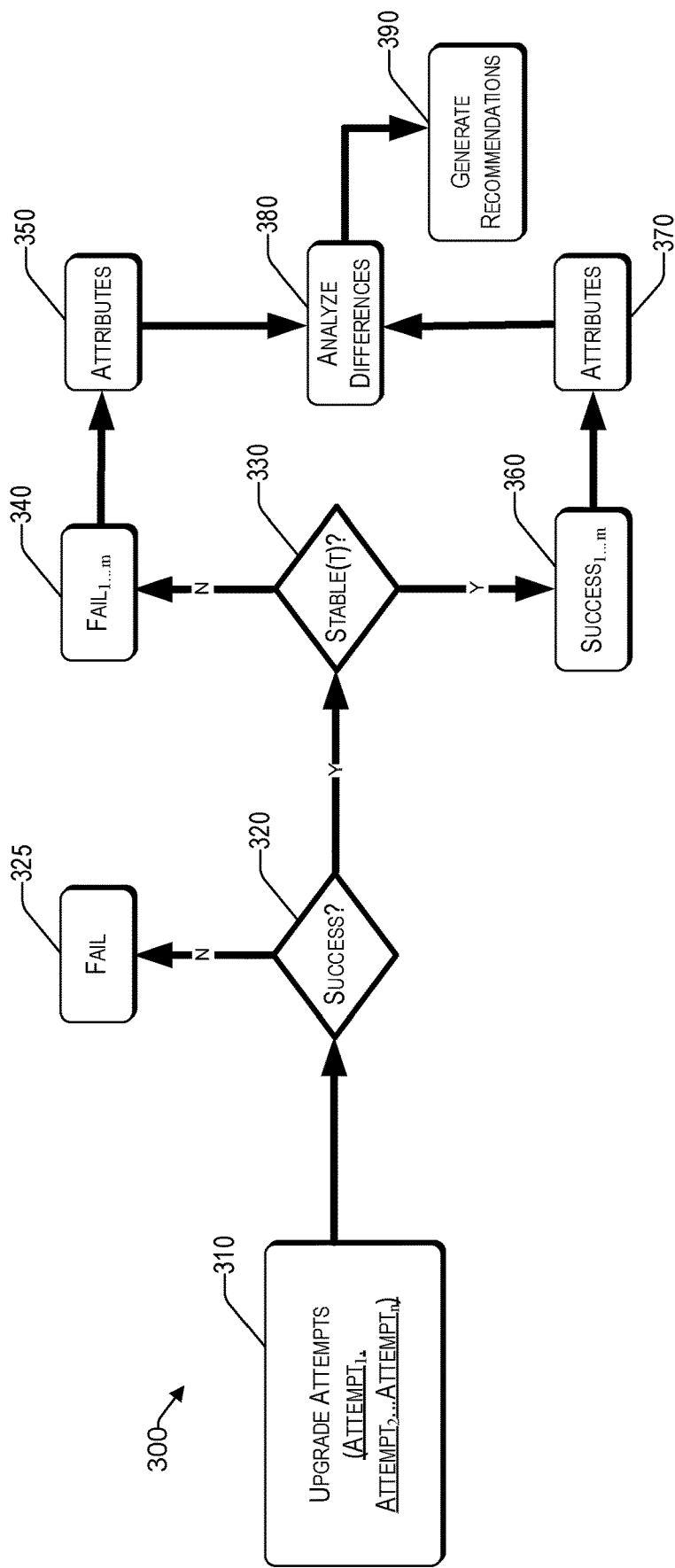
FIG. 3 is a flowchart of a method for determining stability outcomes and sources of instability from software upgrades on computing devices according to an embodiment.

Referring now to FIG. 3, a method 300 for determining stability outcomes and sources of instability from software upgrades on computing devices is shown according to an exemplary embodiment. The method 300 may be triggered in response to one or more computing devices registering an attempt 310 to upgrade a software application. The method 300 may determine 320 whether an upgrade attempt was successful. Unsuccessful attempts may be flagged 325 as a failed upgrade attempt. For successfully installed upgrades, the method may monitor 330 the stability of a computing device (or devices in the event of a multi-device upgrade). The monitoring step 330 may occur in an interval after an installed upgrade which in some embodiments may be end user set or administrator set. Stability may be based on the end device operating uninterrupted. Instability in a computing device that registers a failure flag for example, may be based on software other than the application that was upgraded experiencing a failure (for example, crashing) or hardware that experiences a failure within the same computing device that installed the software upgrade. Failure events may be logged 340. The method 300 may analyze 350 what attributes in the computing device's environment may have contributed to the failure. The attributes may include content of the software upgrade, conflicts with other software applications in the computing device, and hardware that does not respond as expected to the upgraded software. In some embodiments, stability benchmarking attributes may be categorized into three major groups with binary (true/false) values at their simplest form. Stability criteria may also include a numerical or string value with thresholds or allowed set of values:

1. Enterprise-wide baseline stability attributes: WLAN working, VPN working, Certificates installed, System crash exceeded a threshold with a timeframe, Email working etc.
2. User/Employee job role-based stability attributes: A customer support needs to have access to the support ticket system, a developer has to have access to Git repository, Cloud platform dashboard etc.
3. Employee defined custom attributes: A developer may define a certain application such as graphical Git client or Microsoft Office® program on her machine to be working after the upgrade as additional success criteria. Such employee defined success criteria may further be recommended automatically for other employees with similar job roles.

Failure criteria of each attribute may be specified as a Boolean value (false), numerical value below a threshold (1, threshold: 3), or an allowed string value ("required": "1.0.1", "found": "0.11.0").

Successful upgrades may be logged 360. The attributes which are associated with a successful upgrade may be identified 370.

In an exemplary embodiment, the method 300 may compare the attributes associated with failed upgrade attempts to those associated with successful upgrade attempts and may analyze 380 the differences in attributes to determine the sources of success and failure. The results of analysis may be used to project the potential for success or upgrade in other computing devices which will upgrade the same software application. The method 300 may include generating 390 recommendations of whether to install a software upgrade in a computing device based on the results from the analysis of differences. In some embodiments, a user of a computing device presented with the option to install a software upgrade may be presented with a recommendation based on the same software upgrade version having been installed in another computing device with a similar profile. For example, if a computing device has one or more software applications (software A and software B) that conflicted with the upgrade of a different software application (software C) on a different computing device that also has software A and software B, the recommendation may present a risk level of installing the software upgrade. There may be other underlying factors in the device's profile that may raise or lower the risk level.

Figure 4:
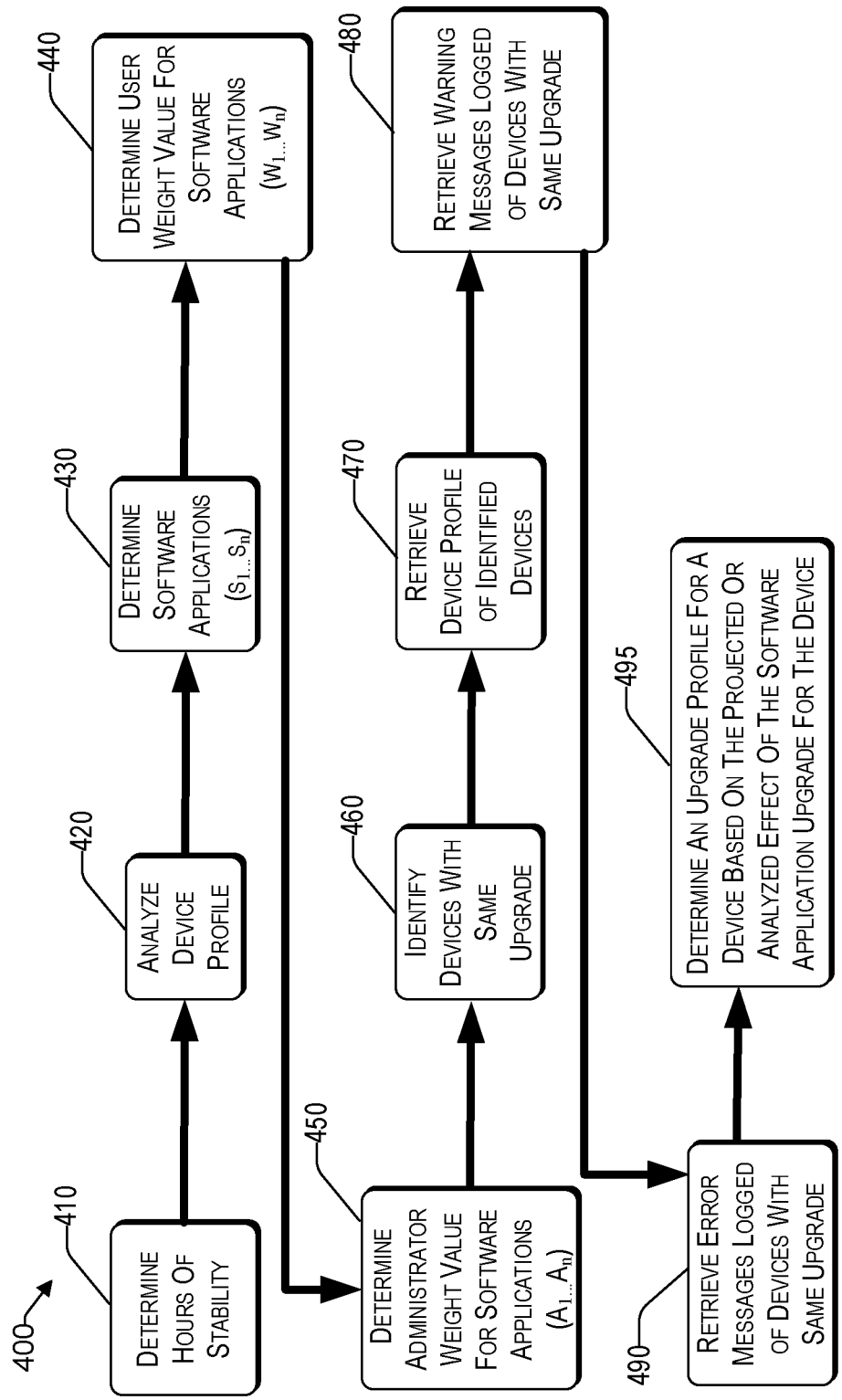
FIG. 4 is a flowchart of a method for evaluating a risk impact of a software upgrade on a computing device according to an embodiment.

Referring now to FIG. 4, a method for evaluating a risk impact of a software upgrade on a computing device is shown according to an exemplary embodiment. The method 400 generally includes evaluating the current operating state of a computing device. The method may begin by determining 410 the current duration of stability for a device. Periodically, the update recommendation engine may analyze 420 the computing device's current profile. The current software applications (and their most current version) resident on the computing device may be determined 430. Some embodiments may receive a weighting value from the computing device end user, which prioritizes the importance of software applications on the device. The update recommendation engine may determine 440 the weight assigned to software being analyzed.

In some embodiments, a system administrator may assign weighted values to software being used in computing devices within a network. The update recommendation engine may determine 450 the weighted value assigned by the administrator for each software application. In evaluating the risk associated with a software upgrade, the update recommendation engine may identify 460 computing devices in the network with the same software upgrade installed. The device profile for identified computing devices with the same upgrade may be retrieved 470. In some embodiments, warning messages logged by the identified devices may be retrieved 480. Some embodiments may include retrieving 490 error messages logged by the identified devices. The device profiles, warning messages and/or error messages may be used to determine the potential for the software upgrade to impact another computing device. For example, a history of warning and error messages related to the software upgrade being analyzed in other computing devices (and potentially more so in devices with similar configurations to the computing device being analyzed), may indicate a higher probability of failure or instability caused by installing the software upgrade. Embodiments may include determining 495 an upgrade profile for the computing device that may be upgrading the subject software application being analyzed for effect on the computing device.

Example Criteria for Determining Instability or Risk

Referring still to FIG. 4, the following draft formulation briefly clarifies how upgrade recommendations may be generated according to an exemplary embodiment:
Given:
t hours of mandatory time of stability,
d profile for a particular device that describes hardware and software components on the device, their versions, and historical upgrade and installation data,
S={s1, s2, . . . sn} software products or applications that matter to the user, and their current version numbers,
W={w1, w2, . . . wn} corresponding weights of priority set by the user for each software application,
A={A1, A2, . . . An} corresponding weights set by administrators for an enterprise network for each software application in the network,
and given a particular intended upgrade action on software s U(s), the recommendation module (see FIG. 2) may perform an analysis on the following data sets:

device profile for each device that performed the same upgrade U, to locate devices similar to the intended device,
warning messages logged since the same upgrade was performed on another device, for all devices with a similar profile,
error messages, likewise.

The recommendation module as a function $f(t, S, W, A, U(s))$ generates (R, R'), a recommendation on analyzed historical data, with a value signifying, by increasing magnitude, the recommendation for upgrade U(s), using, for example, weighted arithmetic mean for a given software product or application. The recommendation module may generate an upgrade profile, which may be a tuple (R, R') where:

R is a final recommendation value indicating the magnitude of recommending the upgrade. For example, 1.0 may be an absolute recommendation for applying upgrade U(s) and 0.0 may be an absolute recommendation against it.

R'={r1, r2, . . . rn} is the recommendation unit scoring where the r that corresponds with software s is a measure of the latter's projected stability after applying upgrade U(s).

For example, assuming a device with a pending software update, where S={ software A version 1089, software B} is the set of only two software products on the device. Requesting a projection for applying upgrade U(software A version 1099), and assuming that W=A={1.0, 1.0}, both the user and enterprise administrators assign equal weights to the two software products, the result may be R=0.9 and R'={1.0, 0.8}.

The results in R' indicate that the recommender measured perfect stability for software A after upgrading to version 1099, and not-so-perfect stability for software B. The weighted mean of 0.9 was then assigned to the final recommendation R, and now it is up to the user to decide whether or not this is good enough. Further queries to the recommendation module may obtain how long previous devices on the same upgrade path were stable for (that should have met the threshold t), as well as how many similar devices were considered for the data used in the recommendation.

Example Computer Platform

Figure 5:
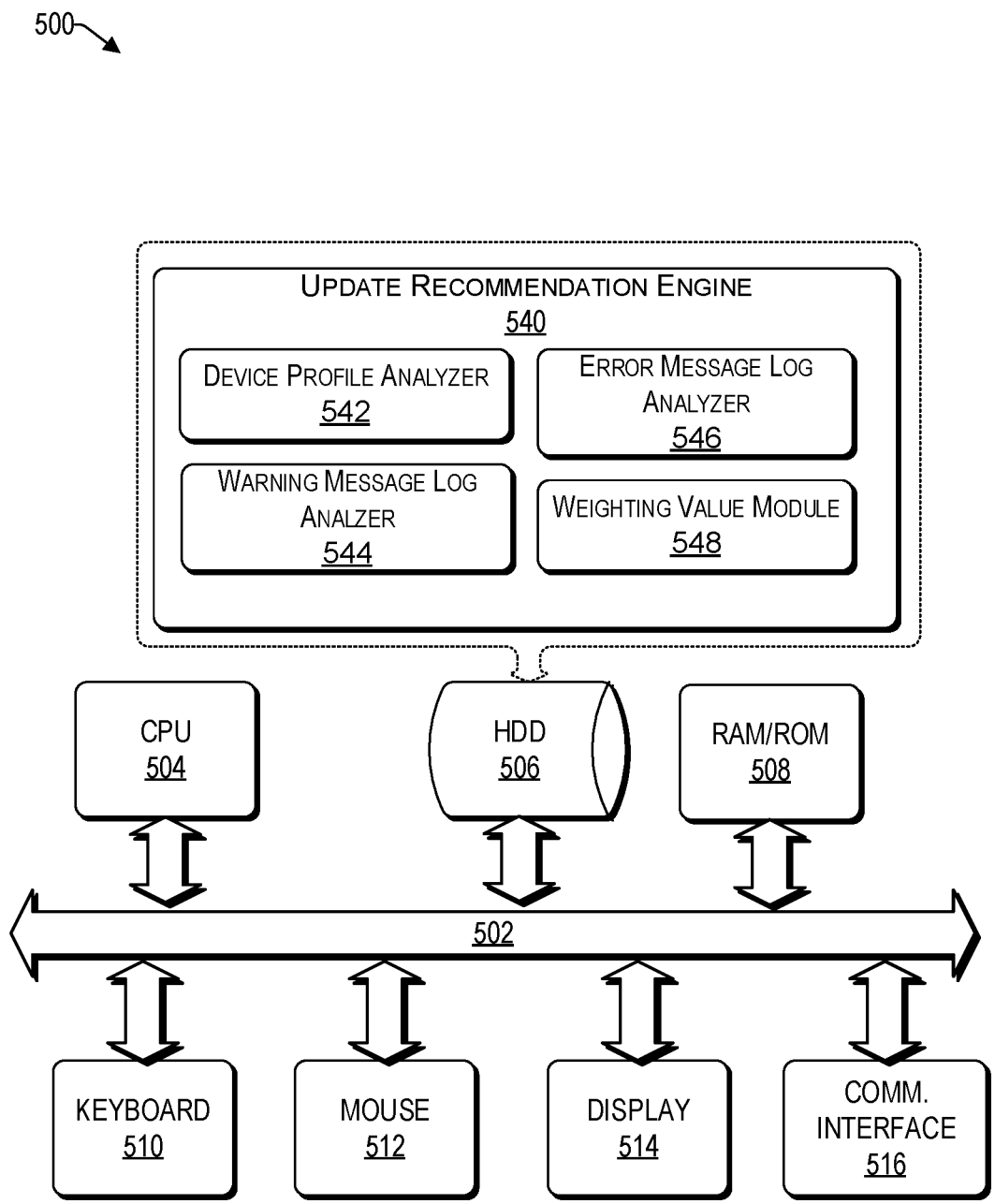
FIG. 5 is a functional block diagram illustration of a computer hardware platform that can communicate with various networked components.

As discussed above, functions relating to interpretable modeling of the subject disclosure can be performed with the use of one or more computing devices connected for data communication via wireless or wired communication, as shown in FIG. 1. FIG. 5 is a functional block diagram illustration of a computer hardware platform that can communicate with various networked components, such as a training input data source, the cloud, etc. In particular, FIG. 5 illustrates a network or host computer platform 500, as may be used to implement a server, such as the update recommendation server 116 of FIG. 1.

The computer platform 500 may include a central processing unit (CPU) 504, a hard disk drive (HDD) 506, random access memory (RAM) and/or read only memory (ROM) 508, a keyboard 510, a mouse 512, a display 514, and a communication interface 516, which are connected to a system bus 502.

In one embodiment, the HDD 506, has capabilities that include storing a program that can execute various processes, such as the update recommendation engine 540, in a manner described herein. Generally, the update recommendation engine 540 may be configured to analyze computing devices for projected stability after a software upgrade under the embodiments described above. The update recommendation engine 540 may have various modules configured to perform different functions. In some embodiments, the update recommendation engine 540 may include sub-modules. For example, a device profile analyzer 542, a warning message log analyzer 544, an error message log analyzer 546, and a weighting value module 548.

In one embodiment, the HDD 506 can store an executing application that includes one or more library software modules, such as those for the Java™ Runtime Environment program for realizing a JVM (Java™ virtual machine).

In another embodiment, the computer platform 500 may represent an end user computer (for example, computing devices 102(1) to 102(N)). In this context, the various end user computer platforms 500 may include mixed configurations of hardware elements and software packages. As will be appreciated, aspects of the subject disclosure analyze the variations of hardware/software elements present in respective computer platforms 500 for their contribution in compatibility with a software upgrade. Thus, a software upgrade in one computer platform 500 may be stable given the hardware and software version of applications present. Yet another computer platform 500 may include a hardware or software element that was not accounted for by the software upgrade. The result may be instability or failure in the operation of one or more computer platform elements.

Example Cloud Platform

As discussed above, functions relating to analyzing the impact of a software upgrade on a computing device, may include a cloud 120 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
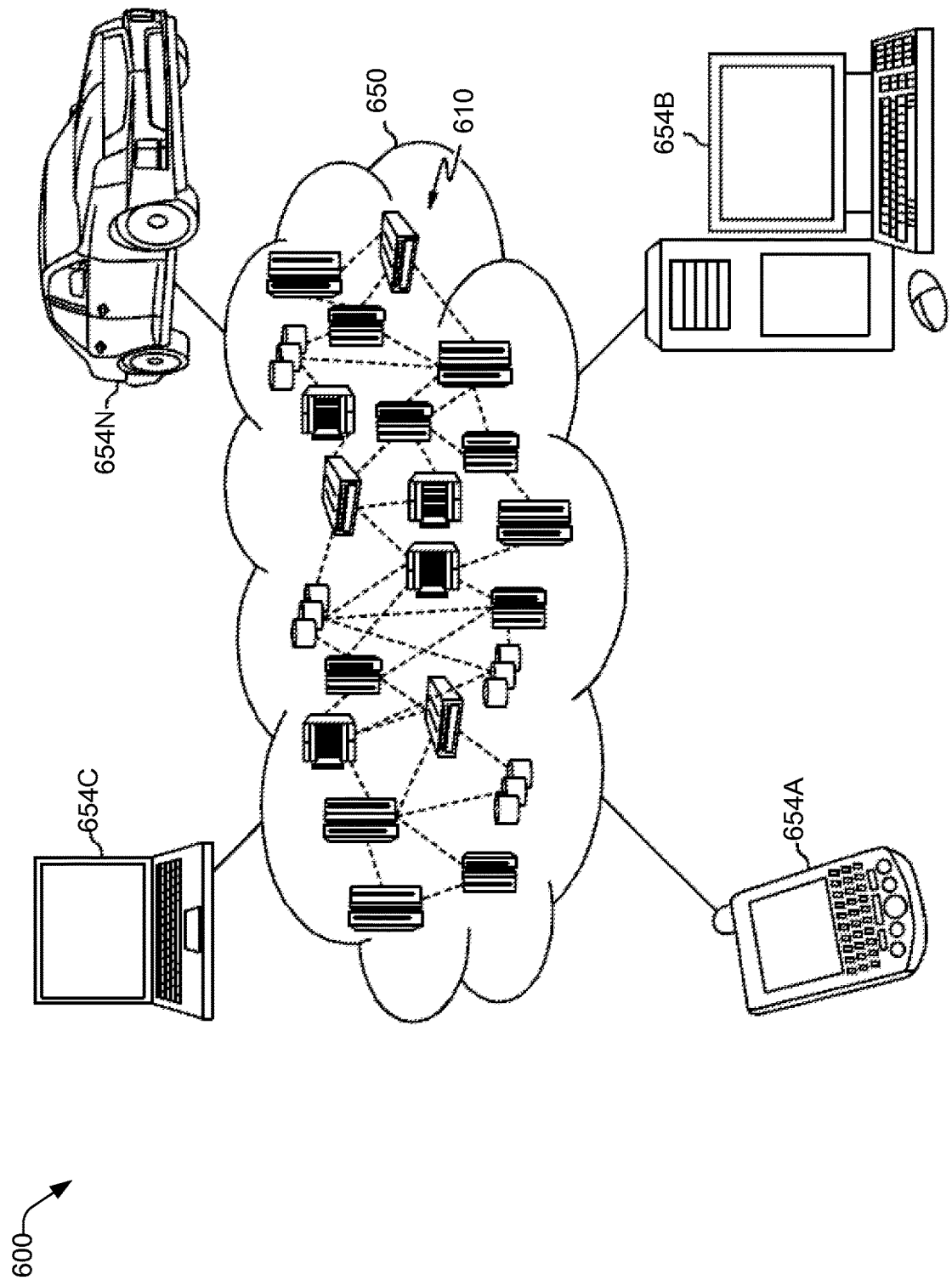
FIG. 6 depicts a cloud computing environment, consistent with an illustrative embodiment.

Referring now to FIG. 6, an illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 810 and cloud computing environment 650 can communicate with any type of computerized device over any type of network and/or network addressable connection (e.g., using a web browser).

Figure 7:
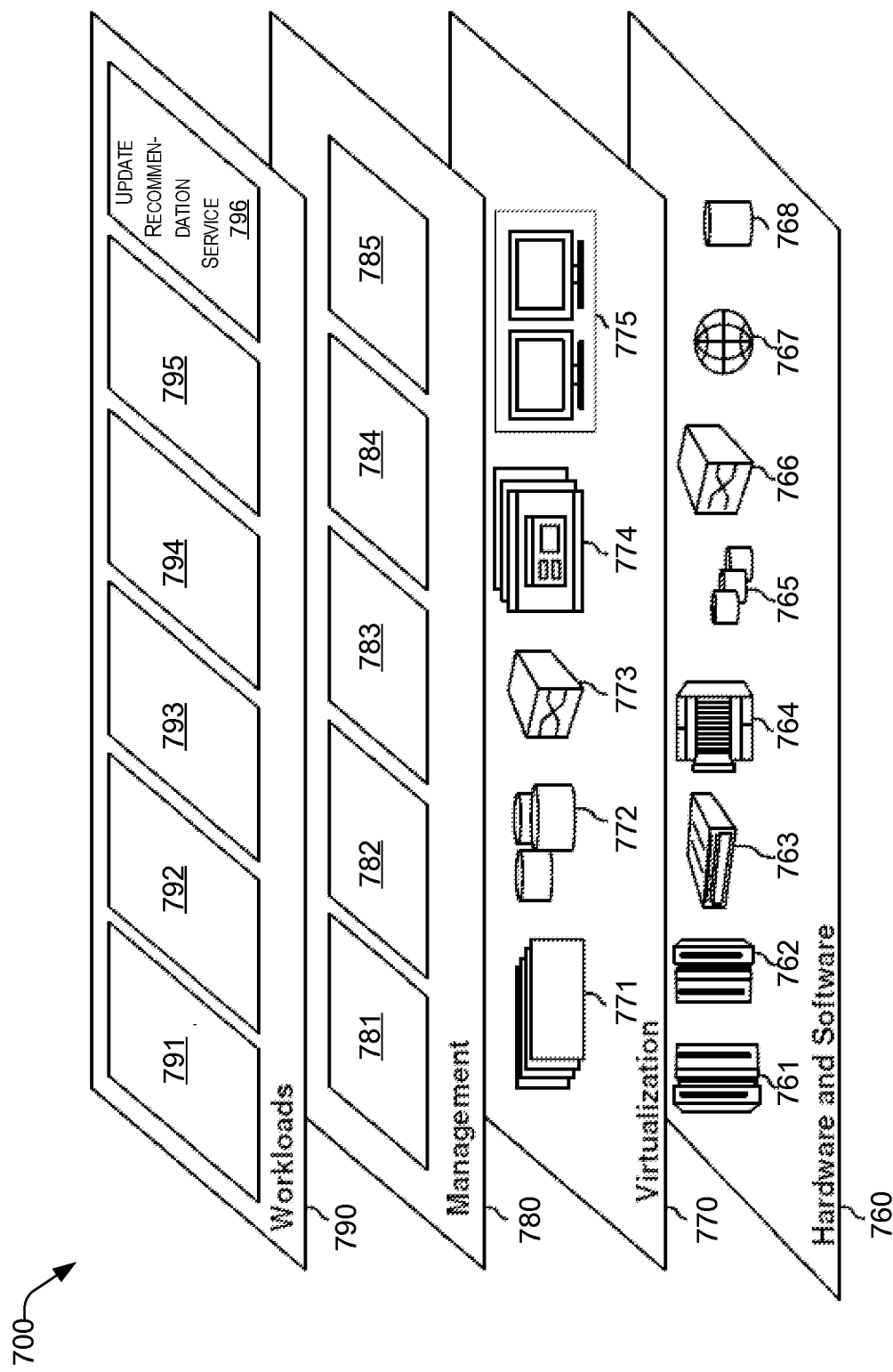
FIG. 7 depicts abstraction model layers, consistent with an illustrative embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and software recommendation services 796, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method for determining a potential impact from a software application upgrade on a first computing device, comprising:
   in a network including a plurality of computing devices, recording a profile of software and hardware elements currently present in each computing device;
   receiving a query for the software application upgrade for a software application resident in the first computing device;
   determining a duration of stability for the first computing device;
   identifying a profile of the first computing device based on the software and hardware elements currently present in the first computing device;
   identifying other computing devices in the network having installed the software application upgrade;
   retrieving a history of operating behavior associated with the software application upgrade in the identified other computing devices, wherein the history of operating behavior includes warning and/or error messages related to the software application upgrade;
   retrieving a profile for each of the other computing devices;
   analyzing the profile for each of the other computing devices for hardware and software conflicts with the software application;
   determining whether the software application upgrade will potentially cause a failure in the software and hardware elements currently present in the first computing device based on the history of operating behavior associated with the software application upgrade in the identified other computing devices and based on a state of similarity between the analyzed profile for each of the other computing devices and the profile of the first computing device; and
   presenting an end user of the first computing device with a risk-based recommendation of whether to install the software application upgrade into the first computing device based on the determination of whether the software application upgrade will potentially cause the failure.

2. The method of claim 1, further comprising:
   identifying a second computing device, wherein the second computing device exhibits a stable operating configuration;
   identifying attributes related to failure events associated with the software upgrade in the respective other computing devices;
   analyzing differences between the stable operating configuration of the second computing device and a configuration of each of the respective other computing devices with the failure events associated with the software upgrade; and
   determining the differences in the stable operating configuration of the second computing device and the configuration of the each of the respective other computing devices, wherein the risk-based recommendation is based on the determined differences.

3. The method of claim 2, wherein the identified attributes include content of the installed software application upgrade, conflicts with other software applications in the respective other computing devices, and hardware in the respective other computing devices that does not respond as expected to the upgraded software application.

4. The method of claim 1, further comprising recording the profile in the first computing device immediately before or after an installation of the software application upgrade in the first computing device.

5. The method of claim 1, further comprising:
receiving a weighting value from the end user; and
associating the weighting value with the software application, wherein the recommendation of whether to install the software upgrade into the first computing device is based further on the weighting value of the software application.

6. The method of claim 1, further comprising:
receiving a weighting value from a system administrator; and
associating the weighting value with the software application, wherein the recommendation of whether to install the software upgrade into the first computing device is based further on the weighting value of the software application.

7. The method of claim 1, further comprising:
logging the error and/or warning messages from the other computing devices having installed the software application upgrade; and wherein
the determination of whether the software application upgrade will potentially cause the failure in the software or hardware elements currently present in the first computing device is based on a history of the logged error and/or warning messages from the other computing devices in the network having installed the software application upgrade.

8. A computer program product for determining a potential impact from a software application upgrade on a first computing device, the computer program product comprising:
program instructions collectively stored on one or more non-transitory computer readable storage media that, when executed, causes a computing device to carry out a method, the method comprising:
in a network including a plurality of computing devices, recording a profile of software and hardware elements currently present in each computing device;
receiving a query for a software application upgrade for a software application resident in a first computing device;
identifying a device configuration for the first computing device based on the software and hardware elements currently present in the first computing device;
identifying other computing devices in the network having installed the software application upgrade;
receiving a query for the software application upgrade for a software application resident in the first computing device;
determining a duration of stability for the first computing device;
retrieving a profile for each of the other computing devices;
analyzing the profile for each of the other computing devices for software conflicts with the software application;
determining whether the software application upgrade will potentially cause a failure in the software elements currently present in the first computing device based on a history of operating behavior associated with the software application upgrade in the identified other computing devices and based on a state of similarity between the analyzed profile for each of the other computing devices and the profile of the first computing device, wherein the history of operating behavior includes warning and/or error messages related to the software application upgrade; and
presenting an end user of the first computing device with a risk-based recommendation of whether to install the software application upgrade into the first computing device based on the determination of whether the software application upgrade will potentially cause the failure.

9. The computer program product of claim 8, wherein the method further comprises:
identifying a second computing device, wherein the second computing device exhibits a stable operating configuration;
identifying attributes related to failure events associated with the software application upgrade in the respective other computing devices;
analyzing differences between the stable operating configuration of the second computing device and configuration of the each of the respective other computing devices with failure events associated with the software application upgrade; and
determining the differences in the stable operating configuration of the second computing device and the configuration of the each of the respective other computing devices, wherein the risk-based recommendation is based on the determined differences in configuration.

10. The computer program product of claim 9, wherein the identified attributes include content of the installed software application upgrade, conflicts with other software applications in the respective other computing devices, and hardware in the respective other computing devices that does not respond as expected to the upgraded software application.

11. The computer program product of claim 8, wherein the method further comprises:
analyzing the profile for each of the other computing devices for hardware conflicts, in addition to the analyzing the profile for each of the other computing devices for the software conflicts, with the software application; and
determining whether the software application upgrade will potentially cause a failure in hardware elements currently present in the first computing device based on the history of operating behavior associated with the software application upgrade in the identified other computing devices and based on a state of similarity between the analyzed profile for each of the other computing devices and the profile of the first computing device.

12. The computer program product of claim 11, wherein the method further comprises:
logging error and/or warning messages from the other computing devices having installed the software application upgrade; and wherein the determination of whether the software application upgrade will potentially cause failure in the software or hardware elements currently present in the first computing device is based on a history of the logged error and/or warning messages from the other computing devices in the network having installed the software application upgrade.

13. The computer program product of claim 8, wherein the method further comprises:
receiving a weighting value from the end user; and associating the weighting value with the software application, wherein the recommendation of whether to install the software application upgrade into the first computing device is based further on the weighting value of the software application.

14. The computer program product of claim 8, wherein the method further comprises:
receiving a weighting value from a system administrator; and associating the weighting value with the software application, wherein the recommendation of whether to install the software application upgrade into the first computing device is based further on the weighting value of the software application.

15. An update recommendation computer server, comprising:
a computing device;
a network connection coupled to the computing device;
one or more computer readable storage media stored in the computing device;
a processor coupled to the network connection and coupled to the one or more computer readable storage media; and
a computer program product comprising program instructions collectively stored on the one or more computer readable storage media, the program instructions, when executed, to perform a method, the method comprising:
in a network including a plurality of computing devices, recording a profile of software and hardware elements currently present in each computing device;
receiving a query for a software application upgrade for a software application resident in a first computing device;
determining a duration of stability for the first computing device;
identifying a profile of the first computing device based on the software and hardware elements currently present in the first computing device;
identifying other computing devices in the network having installed the software application upgrade;
retrieving a history of operating behavior associated with the software application upgrade in the identified other computing devices, wherein the history of operating behavior includes warning and/or error messages related to the software application upgrade; retrieving the profile for each of the other computing devices;
analyzing a profile for each of the other computing devices for hardware and software conflicts with the software application;
determining whether the software application upgrade will potentially cause a failure in the software or hardware elements currently present in the first computing device based on the history of operating behavior associated with the software application upgrade in the identified other computing devices and based on a state of similarity between the analyzed profile for each of the other computing devices and the profile of the first computing device; and
presenting an end user of the first computing device with a risk-based recommendation of whether to install the software application upgrade into the first computing device based on the determination of whether the software application upgrade will potentially cause the failure.

16. The computer server of claim 15, wherein the method further comprises:
identifying a second computing device, wherein the second computing device exhibits a stable operating configuration;
identifying attributes related to failure events associated with the software application upgrade in the respective other computing devices; analyzing differences between the configuration of the second computing device and each of the respective other computing devices with failure events associated with the software application upgrade; and determining the differences in configuration of the second computing device and of the respective other computing devices, wherein the risk-based recommendation is based on the determined differences in configuration.

17. The computer server of claim 15, wherein the method further comprises:
recording the profile in the first computing device immediately before or after an installation of the software application upgrade in the first computing device.

18. The computer server of claim 15, wherein the method further comprises:
receiving a weighting value from the end user; and associating the weighting value with the software application, wherein the recommendation of whether to install the software application upgrade into the first computing device is based further on the weighting value of the software application.

19. The computer server of claim 15, wherein the method further comprises:
receiving a weighting value from a system administrator; and associating the weighting value with the software application, wherein the recommendation of whether to install the software application upgrade into the first computing device is based further on the weighting value of the software application.

20. The computer server of claim 15, wherein the method further comprises:
logging error and/or warning messages from the other computing devices having installed the software application upgrade; and wherein the determination of whether the software application upgrade will potentially cause the failure in the software or hardware elements currently present in the first computing device is based on a history of the logged error and/or warning messages from the other computing devices in the network having installed the software application upgrade.

* * * * *